United States Patent
Ayandeh

(10) Patent No.: US 10,516,619 B2
(45) Date of Patent: Dec. 24, 2019

(54) TCP WINDOW SIZING

(71) Applicant: Hewlett Packard Enterprise Development LP, Houston, TX (US)

(72) Inventor: Siamack Ayandeh, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 31 days.

(21) Appl. No.: 15/714,185

(22) Filed: Sep. 25, 2017

(65) Prior Publication Data

US 2019/0097937 A1 Mar. 28, 2019

(51) Int. Cl.
*H04L 12/807* (2013.01)
*H04L 12/801* (2013.01)
*H04L 12/825* (2013.01)

(52) U.S. Cl.
CPC ............ *H04L 47/27* (2013.01); *H04L 47/193* (2013.01); *H04L 47/196* (2013.01); *H04L 47/26* (2013.01)

(58) Field of Classification Search
None
See application file for complete search history.

(56) References Cited

U.S. PATENT DOCUMENTS

| 7,483,374 | B2 * | 1/2009 | Nilakantan | ............ H04L 45/04 370/235 |
| 8,681,768 | B2 | 3/2014 | Cote et al. | |
| 9,407,518 | B2 | 8/2016 | Kay | |
| 2009/0154356 | A1 * | 6/2009 | Wiemann | .............. H04L 1/1809 370/236 |
| 2010/0054123 | A1 | 3/2010 | Yong et al. | |
| 2012/0069829 | A1 | 3/2012 | Cote et al. | |
| 2014/0169196 | A1 | 6/2014 | Kay | |
| 2015/0029841 | A1 | 1/2015 | Takayanagi et al. | |
| 2015/0249611 | A1 | 9/2015 | Uozumi | |
| 2017/0070444 | A1 * | 3/2017 | Dhanabalan | ........ H04L 47/2441 |

OTHER PUBLICATIONS

Blanton, E., et al.; "On the impact of Bursting on TCP Performance," 2005, pp. 1-8.
Cisco, "Monitor Microbursts on Cisco Nexus 5600 Platform and Cisco Nexus 6000 Series Switches," Jan. 19, 2017, pp. 1-4.
Iyengar, J., et al., "TCP Burst Mitigation Through Congestion Window Limiting," Internet Engineering Task Force, Internet Draft, Jul. 2006, pp. 1-7.

* cited by examiner

*Primary Examiner* — Mohammad S Adhami
(74) *Attorney, Agent, or Firm* — Park, Vaughan, Fleming & Dowler LLP

(57) ABSTRACT

An example system for Transmission Control Protocol (TCP) window sizing is disclosed. The example disclosed herein comprises a data flow detection engine, a TCP connection engine, a feedback engine, and a TCP window sizing engine. The data flow detection engine is to detect the number of data flows received by a buffer from a network component. The TCP connection engine is to determine a number of TCP connections within the network component from the number of data flows. The feedback engine is to send a feedback signal to a source of at least one of the number of TCP connections based on a state of the buffer and the number of TCP connections. The TCP window sizing engine is to adjust a TCP window size based on the feedback signal.

20 Claims, 4 Drawing Sheets

TCP WINDOW SIZING

BACKGROUND

Virtualization is a technology that enables execution of a plurality of applications via software on hardware devices. For example, it may refer to the creation of Virtual Machines (VM) that behave like real hardware with operating system and allow applications to be executed therein. The hardware devices wherein virtualization is taking place may be called hosts.

Transmission Control Protocol (TCP) is a connection-oriented protocol, which means a connection is established and maintained until the application at each end has finished exchanging data (e.g., packets in a data flow). TCP further determines how to break application data into packets that networks can deliver, send packets to a network layer, accepts packets from the network layer, manages data flow control, and handles retransmission of dropped packets.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
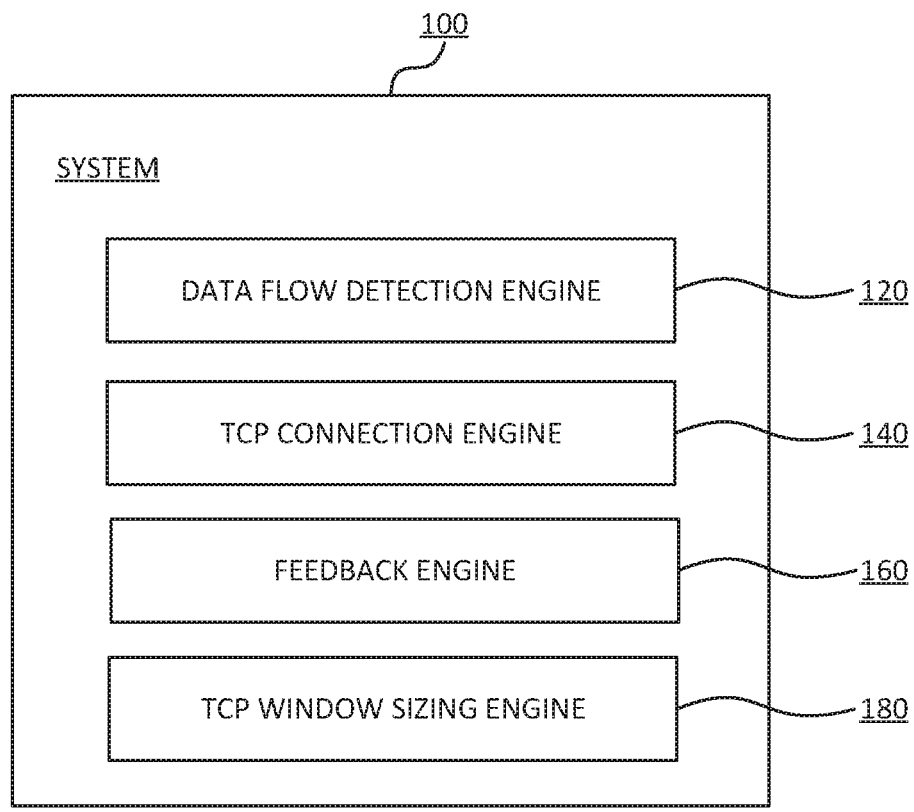
FIG. 1 is a block diagram illustrating an example of a system to perform TCP window sizing.

The following description is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to indicate that the scope of the disclosure, including the claims, is limited to that example. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Virtualization is a technology that enables execution of a plurality of applications via software on hardware devices. For example, it may refer to the creation of Virtual Machines (VM) that behave like real hardware with operating system and allow applications to be executed therein. The hardware devices wherein virtualization is taking place may be called hosts.

Transmission Control Protocol (TCP) is a connection-oriented protocol, which means a connection is established and maintained until the application at each end has finished exchanging data (e.g., packets in a data flow). TCP further determines how to break application data into packets that networks can deliver, send packets to a network layer, accepts packets from the network layer, manages data flow control, and handles retransmission of dropped packets.

At the times that virtualization was not popular, physical hosts had one or two TCP connections at any given time. However, nowadays enterprises rely on virtualization techniques by gathering VMs in containers and install them in the enterprise hosts (e.g., servers). This has the technical challenge that the host that previously had one or two TCP connections, now may have hundreds of TCP connections.

Each TCP connection is allocated in a maximum TCP window size (e.g., 64 Kbytes), and using some TCP algorithms the TCP connection sources (the entity that sends the TCP connection to the host) can grow the amount of data they send up to the maximum TCP window size. As an illustrative example, a TCP source enables a TCP connection that starts at 4 Kb. Then if the TCP source decides to send more TCP connections, it can send more TCP connections up to the maximum window size (e.g., 64 kb).

The previous have the technical challenge that in a specific moment the number of TCP connections can increase and overflow, since the TCP congestion controls cannot cope with that as they were not designed for that purpose (were designed to handle one or two TCP connections at a time). The previously defined overflow is a microburst.

One example of the present disclosure provides a system for performing TCP window sizing to control microbursts. The system comprises a data flow detection engine, a TCP connection engine, a feedback engine, and a TCP window sizing engine. The data flow detection engine is to detect the number of data flows received by a buffer from a network component. The TCP connection engine is to determine a number of TCP connections within the network component from the number of data flows. The feedback engine is to send a feedback signal to a source of at least one of the number of TCP connections based on a state of the buffer and the number of TCP connections. The TCP window sizing engine is to adjust a TCP window size based on the feedback signal.

Another example of the present disclosure provides a method for performing TCP window sizing to control microbursts. The method performs a plurality of steps. For example, the step of receiving a plurality of data flows in a buffer from the network component, the step of detecting a number of data flows from the buffer, the step of determining a number of TCP connections within the network component from the number of data flows, the step of sending a feedback signal to a source of at least one of the number of TCP connections based on a state of the buffer and the number of TCP connections, and the step of adjusting a TCP window size based on the feedback signal.

Now referring to the drawings, FIG. 1 is a block diagram illustrating an example of a system to perform TCP window sizing. The system 100 may comprise one or more processing units such as a Central Processing Unit (CPU), a System on a Chip (SoC), a single processor, and the like. However, for clarity purposes the one or more processing units may be referred to "the processing unit" hereinafter. The system 100 comprises a data flow detection engine 120, a TCP connection engine 140, a feedback engine 160, and a TCP window sizing engine 180. The data flow detection engine 120, the TCP connection engine 140, the feedback engine 160, and the TCP window sizing engine 180 may be any combination of hardware and programming to implement the functionalities of the engine described herein. In examples described herein, such combinations of hardware and programming may be implemented in a number of different ways. For example, the programming of modules may be a processor executable instructions stored on at least one non-transitory machine-readable storage medium and the hardware for modules may include at least one processor to execute those instructions. In some examples described herein, multiple engines may be collectively implemented by a combination of hardware and programming, as described above. In other examples, the functionalities of the data flow detection engine 120, the TCP connection engine 140, the feedback engine 160, and the TCP window sizing engine 180 may be at least partially implemented in the form of electronic circuitry.

The data flow detection engine 120 is to detect a number of data flows received by a buffer from a network component (e.g., port of a network switch). In the present disclosure, the term "data flow" may be understood as a sequence of data packets from a source computing device to a destination, the destination could be another computing device, a multicast group or a broadcast domain. In one example, the data flow detection engine 120 may detect data flows by identifying a 5-tuple (see, e.g., 5-tuple 200 from FIG. 2) carried in a packet from one of the data flows. In another example, the data flow detection engine 120 may detect additional data flows based on the identified 5-tuple fields carried by the packets therein. In a further example, once the data flow detection engine 120 may detect an additional data flow, the data flow detection engine 120 may record an entry in a data flow table, wherein the entry may be a hash of the additional detected data flow. Then, the data flow detection engine 120 may increment a data flow counter. The previous example, has the technical advantage that the data flow table comprises all the data flow information therein, and the data flow counter is a float field that indicates the number of active data flows in the system 100. Both the data flow table and the data flow counter may be easily accessible by the system 100 modules 120-180 and the system 100 processor. In the present disclosure, the term "hash" may be understood in its broad meaning in the art of computing, which is any function that can be used to map data of arbitrary size to data of fixed size, to be stored in a table (e.g., data flow table) so that then can be used to rapid data lookup. Following with the previous example, in the case that the data flow detection engine 120 may not detect a data flow from the data flow table (e.g., the additional data flow) for a predefined period of time (data flow is absent), the data flow detection engine 120 may decrement the data flow counter, and delete the absent data flow entry from the data flow table.

The TCP connection engine 140 is to determine a number of TCP connections within the network component from the number of data flows. A data flow may use any or no transport layer protocol. The most common transport layer protocol is TCP, however there are other transport layer protocols, for example, User Diagram Protocol (UDP), Datagram Congestion Control Protocol (DCCP), Stream Control Transmission Protocol (SCTP), Resource Reservation Protocol (RSVP), etc. TCP adds connection state to flow at both ends (e.g., the host end and the far end server end). The TCP connection state includes a TCP window of how many bytes of data can be in flight between a host and a server. The window has a maximum size (e.g., maximum TCP window size). Each direction of a TCP connection is independent The feedback engine 160 is to send a feedback signal to a source of at least one of the number of TCP connections based on a state of the buffer and the number of TCP connections. In one example, the feedback signal may be a relationship between the unused buffer capacity and the number of TCP connections within the network component. If there is a large portion of the buffer capacity unused and a low number of TCP connections, it is less likely to occur a microburst than if there is a little portion of unused buffer capacity and a large number of TCP connections.

The TCP window sizing engine 180 is to adjust a maximum TCP window size based on the feedback signal received from the feedback engine 160. By sizing the maximum TCP window size, the system may control how many VMs and containers are installed in a given host and, therefore, can minimize the occurrence of a microburst, since when the TCP window size is full the system 100 is to reject any additional data flow. In one example, the TCP window sizing may be performed by manual configuration.

In the example that the data flows are sent from a plurality of VMs and containers, the system 100 is to send feedback to a load-placement manager to not allocate any further VMs nor containers to the source of the at least one of the number of TCP connections (e.g., server).

In another example of the present disclosure, the network component is a port of an OpenFlow switch, and the system comprises an OpenFlow switch controller. The OpenFlow switch controller is to receive the packet by the OpenFlow switch and detecting if the packet is from an additional data flow. If the packet is an additional data flow, the OpenFlow controller is to increment the data flow counter. Furthermore, the OpenFlow controller is to decrement the data flow counter if a data flow (e.g., the detected additional data flow) is absent for a predetermined period of time.

Figure 2:
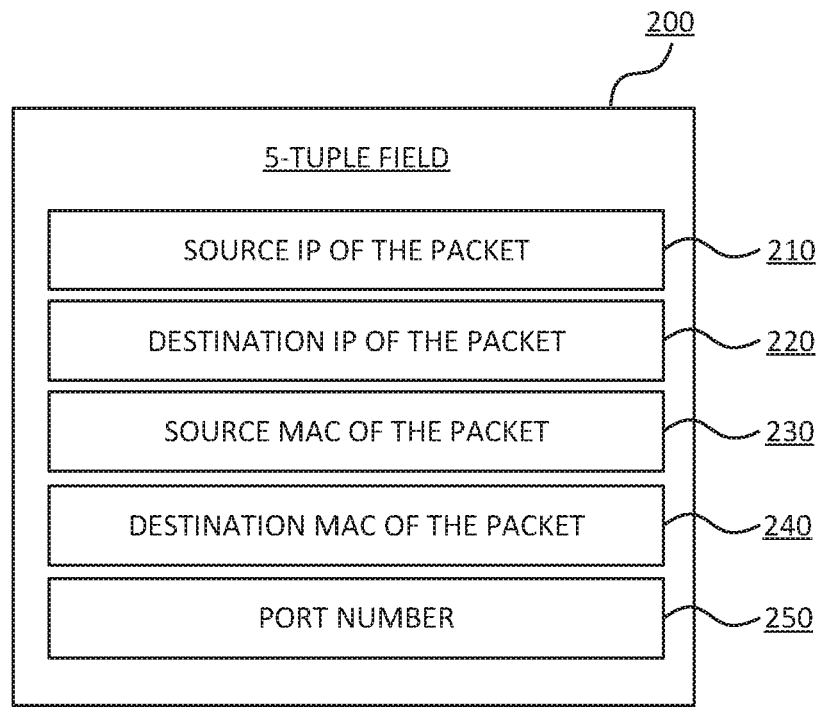
FIG. 2 is a block diagram illustrating an example of a 5-tuple field in a system to perform TCP window sizing.

FIG. 2 is a block diagram illustrating an example of a 5-tuple field in a system to perform TCP window sizing. The 5-tuple field 200 comprises a source Internet Protocol (IP) of the packet 210, a destination IP of the packet 220, a source Media Access Control (MAC) address of the packet 230, a destination MAC address of the packet 240, and a port number 250. The port number 250 may be, for example, a source port address or a destination port address.

Figure 3:
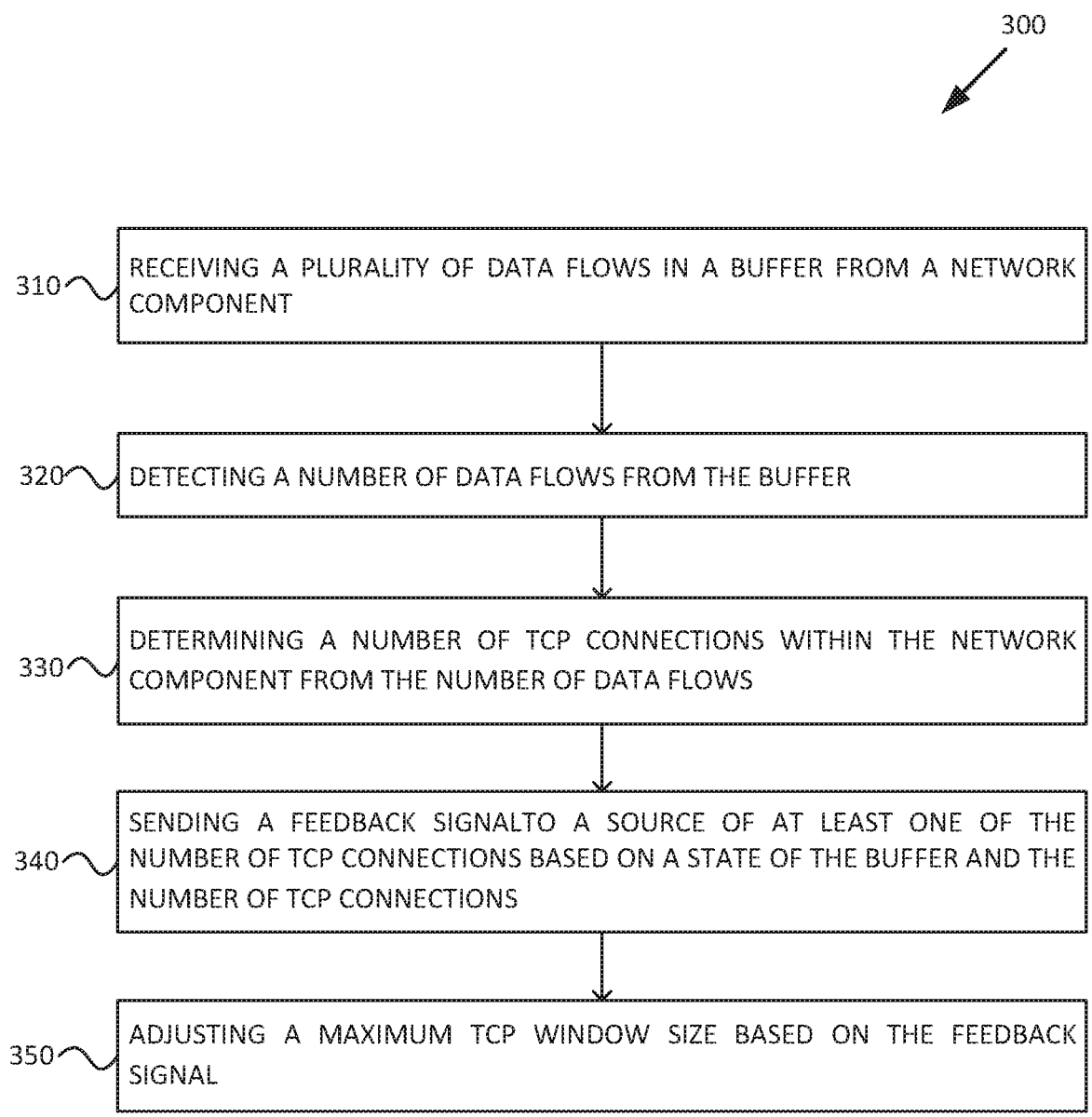
FIG. 3 is a flowchart of an example method for performing TCP window sizing.

FIG. 3 is a flowchart of an example method for performing TCP window sizing. The method may be performed by one or more processing units such as a CPU, a SoC, a single processor and the like. For clarity purposes, the at least one processing units may be referred to as "a processor" or "the processor" hereinafter. Method 300 may be performed, for example, by system 100 from FIG. 1. Method 300 as well as the methods described herein can, for example, be implemented in the form of machine readable instructions stored on a memory of a computing system (e.g., implementation of instructions 441-445 of system 400 of FIG. 4), in the form of electronic circuitry or another suitable form. The method 300 comprises a plurality of blocks to be performed.

At block 310, the system (e.g., system 100 from FIG. 1) receives a plurality of data flows in a buffer from a network component.

At block 320, the system detects a number of data flows from the buffer.

At block 330, the system determines a number of TCP connections within the network component from the number of data flows. In an example of the present disclosure, the method further comprises the steps of identifying a 5-tuple field (e.g., 5-tuple field 200 of FIG. 2) carried in a packet from one of the data flows and based on that 5-tuple field, detecting an additional data flow. After detecting the additional data flow, the method may further comprise the step of recording an entry in a data flow table, wherein the entry is a hash of the additional data flow, and the step of incrementing a data flow counter. Following with the example of the present disclosure, if a detection of the additional dataflow is absent (not detected) for a predefined period of time, the method may further comprise the steps of decrementing the data flow counter, and deleting the entry from the data flow table.

At block 340, the system sends a feedback signal to a source of at least one of the number of TCP connections based on a state of the buffer and the number of TCP connections. In an example, the feedback signal may be a relationship between the unused buffer and the number of data flows.

At block 350, the system adjusts a maximum TCP window size based on the feedback signal.

Figure 4:
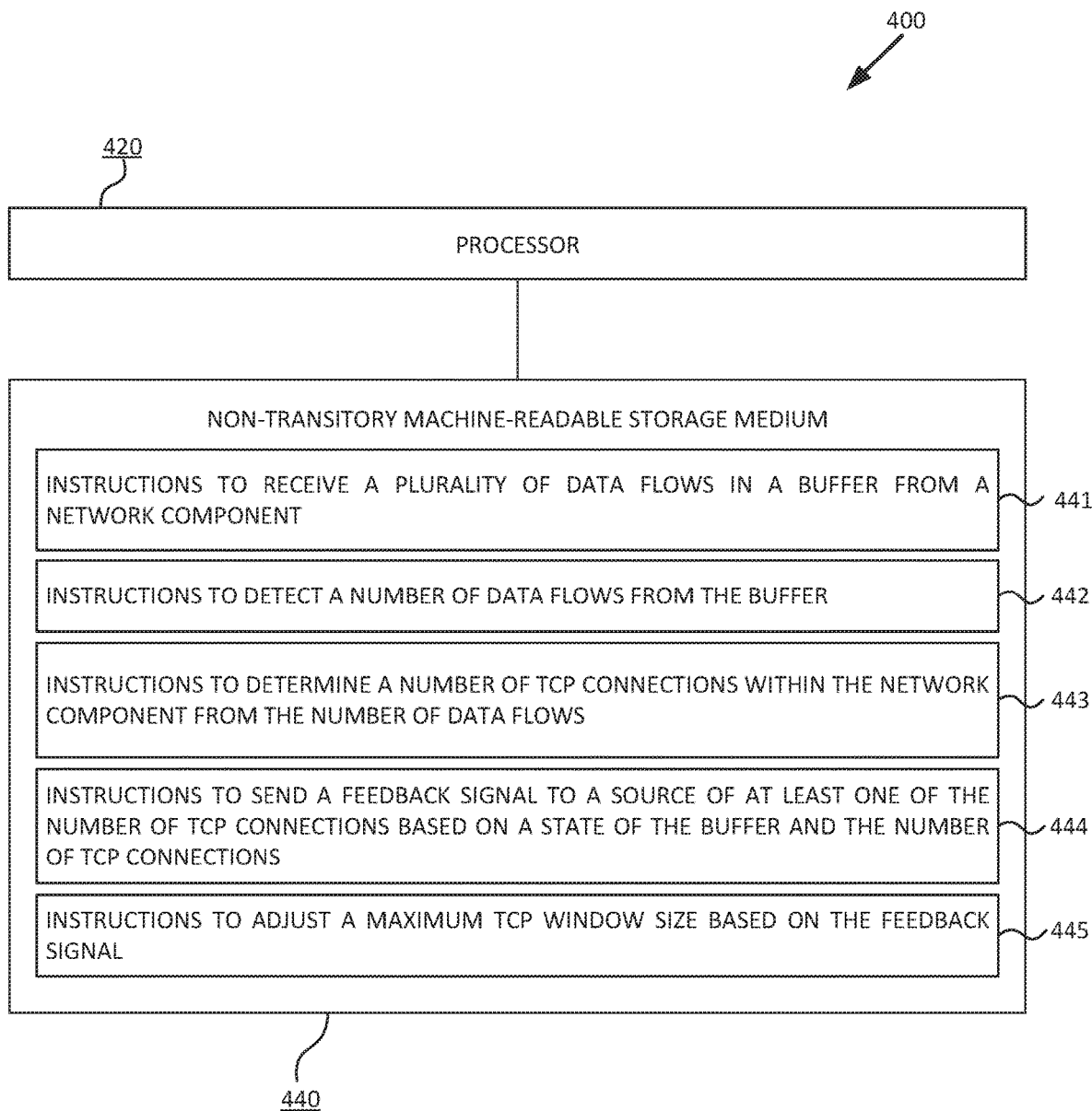
FIG. 4 is a block diagram illustrating another example of a system to perform TCP window sizing.

FIG. 4 is a block diagram illustrating another example of a system to perform TCP window sizing. FIG. 4 describes a system 400 that includes a physical processor 420 and a non-transitory machine-readable storage medium 440. The processor 420 may be a microcontroller, a microprocessor, a central processing unit (CPU) core, an application-specific-integrated circuit (ASIC), a field programmable gate array (FPGA), and/or the like. The machine-readable storage medium 440 may store or be encoded with instructions 441-445 that may be executed by the processor 420 to perform the functionality described herein. System 400 hardware may be the same or similar as the hardware in system 100 of FIG. 1. System 400 may use the method 300 of FIG. 3.

In an example, the instructions 441-445, and/or other instructions can be part of an installation package that can be executed by the processor 420 to implement the functionality described herein. In such case, non-transitory machine readable storage medium 440 may be a portable medium such as a CD, DVD, or flash device or a memory maintained by a computing device from which the installation package can be downloaded and installed. In another example, the program instructions may be part of an application or applications already installed in the non-transitory machine-readable storage medium 440.

The non-transitory machine readable storage medium 440 may be an electronic, magnetic, optical, or other physical storage device that contains or stores executable data accessible to the system 400. Thus, non-transitory machine readable storage medium 440 may be, for example, a Random Access Memory (RAM), an Electrically Erasable Programmable Read-Only Memory (EEPROM), a storage device, an optical disk, and the like. The non-transitory machine readable storage medium 440 does not encompass transitory propagating signals. Non-transitory machine readable storage medium 440 may be allocated in the system 400 and/or in any other device in communication with system 400.

In the example of FIG. 4, the instructions 441, when executed by the processor 420, cause the processor 420 to receive a plurality of data flows in a buffer from a network component.

The system 400 may further include instructions 442 that, when executed by the processor 420, cause the processor 420 to detect a number of data flows from the buffer.

The system 400 may further include instructions 443 that, when executed by the processor 420, cause the processor 420 to determine a number of TCP connections within the network component from the number of data flows.

The system 400 may further include instructions 444 that, when executed by the processor 420, cause the processor 420 to send a feedback signal to a source of at least one of the number of TCP connections based on a state of the buffer and the number of TCP connections.

The system 400 may further include instructions 445 that, when executed by the processor 420, cause the processor 420 to adjust a maximum TCP window size based on the feedback signal.

The system 400 may further include additional instructions that, when executed by the processor 420, cause the processor 420 to identify a 5-tuple field (e.g., 5-tuple field 200 from FIG. 2) carried in a packet from one of the data flows, wherein the 5-tuple field comprises a source IP of the packet, a destination IP of the packet, a source MAC address of the packet, a destination MAC address of the packet, and a port number. Instructions 445 may also cause the processor 420 to detect an additional data flow based on the 5-tuple field.

The above examples may be implemented by hardware or software in combination with hardware. For example the various methods, processes and functional modules described herein may be implemented by a physical processor (the term processor is to be interpreted broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, methods and functional modules are implemented as machine readable instructions executable by at least one processor, hardware logic circuitry of the at least one processors, or a combination thereof.

The drawings in the examples of the present disclosure are some examples. It should be noted that some units and functions of the procedure are not necessarily essential for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What it is claimed is:

1. A system comprising:
a processor; and
a storage device storing instructions when executed by the processor cause the processor to perform a method, the method comprising:
detecting, by a network component, a plurality of data flows received at a buffer associated with the network component;
determining a count of TCP connections within the network component based on the detected data flows;
generating a feedback signal to be sent to source nodes of the TCP connections, wherein the feedback signal comprises a relationship between unused buffer capacity and the count of TCP connections; and
sending the feedback signal from the network component to a source node of at least one TCP connection, the feedback signal instructing the source node to adjust a maximum TCP window size.

2. The system of claim 1, wherein the network component is a port of a network switch.

3. The system of claim 1, wherein the source node of the at least one TCP connection is a server.

4. The system of claim 1, wherein detecting the data flows comprises:
identifying a 5-tuple field carried in a packet from one of the data flows; and
based on the identified 5-tuple field, detecting an additional data flow.

5. The system of claim 4, wherein the 5-tuple field comprises:
a source Internet Protocol (IP) of the packet;
a destination IP of the packet;
a source Media Access Control (MAC) address of the packet;
a destination MAC address of the packet; and
a port number.

6. The system of claim 1, wherein the data flow detection engine is to:
detect an additional data flow;
record an entry in a data flow table, wherein the entry is a hash of the additional data flow; and
increment a data flow counter.

7. The system of claim 6, wherein the detection of the additional data flow is absent for a period of time, the data flow detection engine is to:
decrement the data flow counter; and
delete the entry from the data flow table.

8. The system of claim 2, wherein the network component is a port of an OpenFlow switch and the system comprises an OpenFlow switch controller to:
receive a packet by the OpenFlow switch;
in response to the OpenFlow switch detecting an additional data flow, increment a data flow counter; and
in response to an absence of a detection of the additional data flow for a period of time, decrement the data flow counter.

9. The system of claim 1, wherein the feedback signal is a relationship between the unused buffer capacity and the number of TCP connections within the network component.

10. The system of claim 1, wherein the TCP window sizing engine is executed by manual configuration.

11. The system of claim 1, wherein the TCP window size is full, the system is adapted to reject any additional data flow.

12. The system of claim 11, wherein the data flows are sent from a plurality of Virtual Machines (VM) and containers, the system is to send feedback to a load-placement manager to not allocate any further VMs nor containers to the source of at least one of the number of TCP connections.

13. A method comprising:
detecting, by a network component, a plurality of data flows received at a buffer associated with the network component;
determining a count of Transmission Control Protocol (TCP) connections within the network component based on the detected data flows;
generating a feedback signal to be sent to source nodes of the TCP connections, wherein the feedback signal comprises a relationship between unused buffer capacity and the count of TCP connections; and
sending a feedback signal to a source node of at least one TCP connection, the feedback signal instructing the source node to adjust a maximum TCP window size.

14. The method of claim 13 comprising:
identifying a 5-tuple field carried in a packet from one of the data flows; and
based on the identified 5-tuple field, detecting an additional data flow.

15. The method of claim 14, wherein the 5-tuple field comprises:
a source Internet Protocol (IP) of the packet;
a destination IP of the packet;
a source Media Access Control (MAC) address of the packet;
a destination MAC address of the packet; and
a port number.

16. The method of claim 13 comprising:
detecting an additional data flow;
recording an entry in a data flow table, wherein the entry is a hash of the additional data flow; and
incrementing a data flow counter.

17. The method of claim 16, wherein the detection of the additional data flow is absent for a period of time, the method comprising:
decrementing the data flow counter; and
deleting the entry from the data flow table.

18. The method of claim 13, wherein the feedback signal is a relationship between the unused buffer and the number of data flows.

19. A non-transitory machine-readable medium storing machine-readable instructions executable by a physical processor, the instructions causing the processor to:
detect a plurality of data flows received at a buffer associated with a network component;
determine a count of Transmission Control Protocol (TCP) connections within the network component based on the detected data flows;
generate a feedback signal to be sent to source nodes of the TCP connections, wherein the feedback signal comprises a relationship between unused buffer capacity and the count of TCP connections; and
send the feedback signal from the network component to a source node of at least one TCP connection, the feedback signal instructing the source node to adjust a maximum TCP window size.

20. The non-transitory machine-readable medium of claim 19, the medium further comprising machine-readable instructions executable by a processor to:
identify a 5-tuple field carried in a packet from one of the data flows, wherein the 5-tuple field comprises:
a source Internet Protocol (IP) of the packet,
a destination IP of the packet,
a source Media Access Control (MAC) address of the packet,
a destination MAC address of the packet, and
a port number; and
based on the 5-tuple field, detect an additional data flow.

* * * * *